(12) United States Patent
Baumeister

(10) Patent No.: US 12,179,951 B2
(45) Date of Patent: Dec. 31, 2024

(54) DRIVE FOR SEALING JAWS

(71) Applicant: GEA Food Solutions Weert B.V., Weert (NL)

(72) Inventor: Bruno Gerfried Baumeister, Aachen (DE)

(73) Assignee: GEA FOOD SOLUTIONS WEERT B.V., Rv Weert (NL)

( * ) Notice: Subject to any disclaimer, the term of this patent is extended or adjusted under 35 U.S.C. 154(b) by 0 days.

(21) Appl. No.: 18/020,444

(22) PCT Filed: Aug. 16, 2021

(86) PCT No.: PCT/EP2021/072724
§ 371 (c)(1),
(2) Date: Feb. 9, 2023

(87) PCT Pub. No.: WO2022/034243
PCT Pub. Date: Feb. 17, 2022

(65) Prior Publication Data
US 2023/0294863 A1    Sep. 21, 2023

(30) Foreign Application Priority Data
Aug. 14, 2020 (EP) .................................. 20191156

(51) Int. Cl.
*B65B 61/00* (2006.01)
*B29C 65/00* (2006.01)
*B65B 51/30* (2006.01)

(52) U.S. Cl.
CPC ........ *B65B 51/303* (2013.01); *B29C 66/1122* (2013.01); *B29C 66/4322* (2013.01);
(Continued)

(58) Field of Classification Search
CPC ....... B29C 65/02; B29C 66/4312; B65B 9/20; B65B 9/2028; B65B 51/30
See application file for complete search history.

(56) References Cited

U.S. PATENT DOCUMENTS 5,279,098 A * 1/1994 Fukuda ............... B29C 66/7373
53/374.6
5,753,067 A * 5/1998 Fukuda ............... B29C 66/8491
53/374.6
(Continued)

FOREIGN PATENT DOCUMENTS

DE    102007003930 A1    7/2008
DE    102013203295 A1    8/2014
(Continued)

OTHER PUBLICATIONS

International Search Report and Written Opinion for International Application PCT/EP2021/072724.

*Primary Examiner* — Eyamindae C Jallow
(74) *Attorney, Agent, or Firm* — The Dobrusin Law Firm, P.C.

(57) ABSTRACT

Vertical flow-wrapper that includes a frame, a web feed, which feeds a web to a form-shoulder, and a form-fill tube, which forms the web into a web tube, a longitudinal sealing-means to seal longitudinal edges of the web tube together, and a cross sealing means to provide a cross-seal to the web tube. The cross sealing means includes seal jaws, a closing motor, and a jaw closing mechanism; the seal jaws and the jaw closing mechanism reciprocate between an upper and lower vertical position; the closing motor is provided at the frame and a torque transfer means is provided between the closing motor and the jaw closing mechanism; the closing motor and the reciprocation motor are operated independently from each other; and the closing motor is connected to the frame by a slide bearing or is pivotably connected to the frame.

15 Claims, 4 Drawing Sheets

(52) U.S. Cl.
CPC ...... *B29C 66/8221* (2013.01); *B29C 66/8225* (2013.01); *B29C 66/8246* (2013.01); *B29C 66/83543* (2013.01); *B29C 66/849* (2013.01)

(56) References Cited

U.S. PATENT DOCUMENTS

| | | | | |
|---|---|---|---|---|
| 6,088,994 | A * | 7/2000 | Nakagawa | B29C 66/4312 |
| | | | | 53/374.6 |
| 6,427,422 | B2 * | 8/2002 | Nakagawa | B65B 51/306 |
| | | | | 53/437 |
| 8,132,394 | B2 * | 3/2012 | Koike | B65B 9/213 |
| | | | | 53/551 |
| 10,266,288 | B2 * | 4/2019 | Ichikawa | B29C 66/81422 |
| 2003/0093971 | A1 * | 5/2003 | Terminella | B29C 66/849 |
| | | | | 53/133.4 |
| 2006/0229180 | A1 * | 10/2006 | Hashimoto | B29C 66/8161 |
| | | | | 493/287 |

FOREIGN PATENT DOCUMENTS

| | | |
|---|---|---|
| EP | 0560988 A1 | 9/1993 |
| EP | 3378793 A1 | 9/2018 |

* cited by examiner

DRIVE FOR SEALING JAWS

CROSS REFERENCE TO RELATED APPLICATIONS

This Application is a US National Stage of PCT/EP2021/072724 filed on Aug. 16, 2021, which claims priority to EP 20191156.7 filed on Aug. 14, 2020, both of which are hereby incorporated by reference herein for all purposes.

FIELD

The invention relates to a vertical flow-wrapper comprising:
a frame,
a web feed, which, preferably continuously, feeds a web to a form-shoulder and a form-fill tube, which form the web into a web-tube,
longitudinal sealing-means to seal the longitudinal edges of the web tube together and
cross sealing means to provide a cross-seal to the web tube to produce individual packages,
wherein the cross sealing means comprises seal jaws, a closing motor and a jaw closing mechanism provided between the closing motor and the seal jaws and wherein the seal jaws and the jaw closing mechanism reciprocate between an upper and a lower vertical position.

BACKGROUND

The present invention relates to a vertical flow-wrapper. A flow-wrapper, also called flow wrapping machine, is a packaging machine that receives a plane continuous web, for example a film of plastic material, e.g., a thermoplastic material, which is transported, preferably continuously, and passed downwardly over a form shoulder and a vertical form-fill tube and is thereby shaped into a tubular form, i.e. into a tubular web, by being wrapped around the vertical form-fill tube of the flow-wrapper. After being wrapped around the vertical form-fill tube, the web is longitudinally closed by means of a longitudinally extending seal, which is applied to the web especially by heat sealing the lateral/longitudinal margins of the web or by heat sealing in the vicinity of these margins thereby joining them. This is carried out by so called longitudinal-sealing means. The tubular web has conventionally a rectangular, elliptical, circular, pentagonal or irregular shaped cross-sectional area. The tubular web is closed by cross-sealing means, preferably in a direction mainly perpendicular to the direction of flow of the web, i.e. transversely. Thereby, individual packages are defined out of the continuous tubular web. A product, such as a foodstuff, is introduced into the packages by dropping the product through the form-fill tube and into the tubular web surrounding the form-fill-tube. During and/or after filling, the tubular web is transversely open at its upper end, i.e. not cross-sealed. Simultaneously to the filling and/or thereafter, the tubular web together with the product is moved downwardly and then a top cross-seal is formed above the product and thereby a hermetically closed package is produced. As a last step or simultaneously to the application of the top seal, the package is separated from the tubular web by cutting means. There is a continuous demand to improve the productivity and/or the reliability of such vertical flow wrappers.

SUMMARY

The purpose of the invention is therefore to provide a vertical flow-wrapper, which is improved in terms of productivity and/or reliability.

The purpose is attained by providing a vertical flow-wrapper comprising:
a frame,
a web feed, which, preferably continuously, feeds a web to a form-shoulder and a form-fill tube, which form the web into a web-tube,
longitudinal sealing-means to seal the longitudinal edges of the web tube together and
cross sealing means to provide a cross-seal to the web tube to produce individual packages,
wherein the cross sealing means comprises seal jaws, a closing motor and a jaw closing mechanism provided between the closing motor and the seal jaws and wherein the seal jaws and the jaw closing mechanism reciprocate between an upper and a lower vertical position driven by a reciprocation motor,
wherein the closing motor is provided at the frame and a torque transfer means is provided between the closing motor and the jaw closing mechanism
and wherein the closing motor and the reciprocation motor are operated independently from each other.

The disclosure regarding this embodiment of the present invention also applies to the other embodiments of the present invention and vice versa. Subject matters disclosed regarding this embodiment of the present invention can also be combined with other subject matters disclosed regarding this and/or other embodiments of the present invention and vice versa.

The present invention relates to a, preferably continuously, operating vertical flow-wrapper. A vertical flow-wrapper is a packaging machine that receives a continuous plane web, for example a film of plastic material, e.g., a thermoplastic material. The web is transported, preferably continuously, and passed downwardly over a form shoulder and a vertical form-fill tube and is thereby shaped into a tubular form, i.e. into a tubular web, by being wrapped around the vertical form-fill tube of the flow-wrapper. After being wrapped around the vertical form-fill tube, the web is longitudinally closed by means of a longitudinally extending seal, which is applied to the web especially by heat sealing the lateral/longitudinal margins of the web or by heat sealing in the vicinity of these margins thereby joining them. This is carried out by so called longitudinal-sealing means. The tubular web has conventionally a rectangular, elliptical, circular, pentagonal or irregular shaped cross-sectional area. The tubular web is closed by cross-sealing means, preferably in a direction mainly perpendicular to the direction of flow of the web, i.e. transversely to the web transport direction. Thereby, individual packages are defined out of the continuous tubular web. A product, such as a foodstuff, is introduced into the packages by dropping the product through a form-fill tube and into the tubular web. During filling, the tubular web is transversely open at its upper end, i.e. not cross-sealed. Simultaneously to and/or after the filling, the tubular web together with the product is moved downwardly and then a top cross-seal is formed above the product and thereby a hermetically closed package is produced. As a last step or simultaneously to the application of the top seal, each package is separated from the tubular web by cutting means. The cutting means are preferably part of the cross-sealing means.

The cross-sealing means comprises two seal-jaws, a closing motor and a jaw closing mechanism provided between the closing motor and the seal-jaws. The closing motor is preferably an electro-motor, more preferably a servo-motor or a motor with a position transmitter at the output shaft. The jaw closing mechanism preferably converts a rotation of the motor shaft into a linear movement of the seal-jaws. The closing motor and the jaw closing mechanism move the seal-jaws relative to each other between an open- and a sealing-position. The skilled person understands that only one seal jaw needs to be moved. However, the movement of both seal jaws is preferred. In the open-position, the seal jaws are distant from each other; i.e. at least one seal jaw is not or only very little in contact with the formed web, while in the seal position both seal-jaws press the tubular web together and provide the cross-seal and optionally cut the tubular web. The movement between the open- and the sealing-position of the seal jaws is preferably accomplished by a back and forth movement of the motor.

Preferably, the seal jaws and the jaw closing mechanism are reciprocated between an upper and a lower vertical position. During the downward movement, the application of the cross-seal at the continuously moving web tube takes place. After the application of the cross-seal, the cross-sealing means are moved upwards again. This movement is driven by a reciprocation motor, preferably an electro-motor, more preferably a servo-motor or a motor with a position transmitter at the output shaft. The cross-sealing means and the jaw closing mechanism preferably reciprocate between an upper- and a lower dead centre. The reciprocation motor that drives this movement is preferably fixed to the frame of the vertical flow wrapper. To provide the vertical reciprocation movement of the jaws a crank mechanism or a linear system like a spindle or a linear power transmission can be used.

According to the present invention, the closing motor which opens and closes the seal-jaws is provided at the frame of the vertical flow-wrapper and a torque transfer means is provided between the closing motor and the jaw closing mechanism. The torque transfer means is connected to the output shaft of the closing motor and to an input shaft of the jaw closing mechanism. The torque transfers the rotation from the output shaft of the closing motor to the input shaft of the jaw closing mechanism. The gear ratio is preferably, at least approximately, 1:1.

Further according to the present invention, the closing motor and the reciprocation motor are operated independently from each other. Particularly, during the movement of the seal jaws from the upper- to the lower vertical position, more preferably during the sealing, the closing motor does not need to adjust the position of the seal jaws and/or the rotational position of the torque transfer mechanism. During sealing, the position of the closing mechanism is not adjusted. The closing motor is only needed to open and close the seal jaws but not to maintain the seal jaws opened or closed during the vertical reciprocation of seal jaws and the jaw closing mechanism.

Consequently, the closing motor, which actuates the seal jaw(s) does not participate at all or very little in the upward- and/or downward movement of the seal jaws and the jaw closing mechanism. This reduces the inertia of the cross sealing means for the upwards and downwards movement and can result in a faster vertical movement of the cross-sealing jaws and/or in less energy consumption and/or in less vibration.

The control system of the inventive flow wrapper can be simplified, because it preferably does not need to provide continuously or semi-continuously set values to the closing motor during the vertical reciprocation of the seal jaws and the jaw closing mechanism. Preferably, the closing motor only needs a signal in which vertical position the seal jaws need to be opened or closed. During the vertical reciprocation of the seal jaws and the jaw closing mechanism, preferably, the output shaft of the closing motor does not rotate to compensate a movement of the seal jaws resulting from their vertical movement. The closing motor is preferably exclusively needed to open and close the seal jaws.

Preferably, the motor adapts its torque to adapt the needed sealing force during the sealing process. Alternatively or additionally, during sealing, the film material is partly melted, so that the thickness of the film decreases. Preferably the position of the sealing jaws is corrected during the sealing process.

The closing motor can be connected to the frame by a slide bearing, preferably a slide bearing which allows a movement only along one plane, preferably almost horizontal plane, preferably by a linearly moving platform. Alternatively, the closing motor is pivotably connected to the frame. According to another preferred embodiment of the present invention, the plane is provided at a small angle, preferably <20°, more preferably <10° and even more preferably <5° relative to a horizontal plane.

In this case, in vertical direction, the closing motor is preferably provided at frame in a location between an upper- and the lower dead-end centre of the movement of the seal-jaws, preferably near or in the middle of the vertical distance between the upper- and the lower dead-end centre.

The purpose is also attained by providing a vertical flow-wrapper comprising:
a frame,
    a web feed, which, preferably continuously, feeds a web to a form-shoulder and a form-fill tube, which form the web into a web-tube,
    longitudinal sealing-means to seal the longitudinal edges of the web tube together and
    cross sealing means to provide a cross-seal to the web tube to produce individual packages,
wherein the cross sealing means comprises seal jaws, a closing motor and a jaw closing mechanism provided between the closing motor and the seal jaws and
wherein the seal jaws and the jaw closing mechanism reciprocate between an upper and a lower vertical position driven by a reciprocation motor,
wherein the closing motor is provided at the frame and a torque transfer means is provided between the closing motor and the jaw closing mechanism
and wherein the vertical movement of the seal jaws and the jaw closing mechanism does not influence the position of the seal jaws.

The disclosure regarding this embodiment of the present invention also applies to the other embodiments of the present invention and vice versa. Subject matters disclosed regarding this embodiment of the present invention can also be combined with other subject matters disclosed regarding this and/or other embodiments of the present invention and vice versa.

According to this embodiment of the present invention, vertical movement of the seal jaws and the jaw closing mechanism does not influence the position of the seal jaws. Preferably, the jaw closing mechanism and the reciprocation of the seal jaws and the jaw closing mechanism are mechanically decoupled. Preferably, the seal jaws are neither opened nor closed by their vertical movement.

Preferably, the seal pressure provided by the closing motor and the closing mechanism remains constant throughout the entire sealing operation. The closing motor does not need to readjust the position of the sealing jaws during the vertical reciprocation of the seal jaws and the jaw closing mechanism. Preferably, the stiffness of the closing mechanism does not change during the vertical reciprocation of the seal jaws and the jaw closing mechanism. In case the stiffness of the closing mechanism changes during the vertical reciprocation of the seal jaws, this is preferably compensated by jaw closing mechanism.

The purpose is also attained by providing a vertical flow-wrapper comprising:
a frame,
  a web feed, which, preferably continuously, feeds a web to a form-shoulder and a form-fill tube, which form the web into a web-tube,
    longitudinal sealing-means to seal the longitudinal edges of the web tube together and
    cross sealing means to provide a cross-seal to the web tube to produce individual packages,
wherein the cross sealing means comprises seal jaws, a closing motor and a jaw closing mechanism provided between the closing motor and the seal jaws and
wherein the seal jaws and the jaw closing mechanism reciprocate between an upper and a lower vertical position driven by a reciprocation motor,
wherein the closing motor is provided at the frame and a torque transfer means is provided between the closing motor and the jaw closing mechanism and wherein the extent of the vertical movement of the jaws is larger than the extent of the horizontal movement of the jaw driving motor.

The disclosure regarding this embodiment of the present invention also applies to the other embodiments of the present invention and vice versa. Subject matters disclosed regarding this embodiment of the present invention can also be combined with other subject matters disclosed regarding this and/or other embodiments of the present invention and vice versa.

According to this embodiment of the present invention, the extent of the vertical movement of the jaws is larger than the extent of the movement, particularly the horizontal movement of the closing motor which drives the jaws. Movement of the closing motor according to the present invention means the movement of the closing motor in its entirety. The movement of the closing motor can be a linear and/or a rotational movement.

Preferably, the movement of the closing motor is zero or essentially zero during the entire operation of the vertical flow wrapper. Only the output shaft of the closing motor rotates.

Preferably, the closing motor slides, during the reciprocation of the seal jaws between the upper and the lower vertical position along a plane which has at least a horizontal component, preferably along a horizontal plane. Preferably the frame of the vertical flow wrapper comprises a platform and the closing motor which opens and closes the seal jaws is slidably provided on this platform.

Alternatively or additionally, the closing motor rotates relative to the frame during the reciprocation of the seal jaws between the upper and the lower vertical position, preferably around an axis that is perpendicular to the movement of the web or perpendicular to the vertical.

Preferably, the torque transfer means comprises at least two rotational bodies, more preferably at least two wheels, wherein preferably one rotational body is connected to the shaft of the closing motor and one rotational body is connected to the input shaft of the jaw closing mechanism. The two rotational bodies are rotationally connected, preferably slip-free, which transfers the rotation from one rotational body to the other. The rotational bodies preferably have the same diameter. The connection can be at least one rod, each attached eccentrically to two adjacent rotational bodies. Alternatively or additionally, two rotational bodies can be connected by an endless belt, preferably a toothed belt or a metal-band, which is fixedly connected to the two rotational bodies.

Preferably, distancing means are provided between two adjacent rotational bodies, so that a certain distance between two rotational bodies is maintained. The distancing means is preferably a rod or a bar. Preferably, the distancing means is provided between the axis of rotation of the two rotational bodies.

Preferably, the means to transfer the torque from the motor to the jaw closing mechanism is a Schmidt-coupling. A Schmidt-coupling is for example disclosed by www.schmidt-kupplung.com. Due to the Schmidt-coupling as the torque transfer means, the movement of the motor is zero during the vertical reciprocation of the seal jaws.

Further details, features and advantages of the present inventions are described by the drawings and by the following description of preferred embodiments on the basis of the drawings. The drawings illustrate only exemplary embodiments of the present invention, which do not restrict the essential idea of the invention.

DETAILED DESCRIPTION OF THE DRAWINGS

In the different figures the same parts are always provided with the same reference signs and are therefore usually named or mentioned only once.

Figure 1:
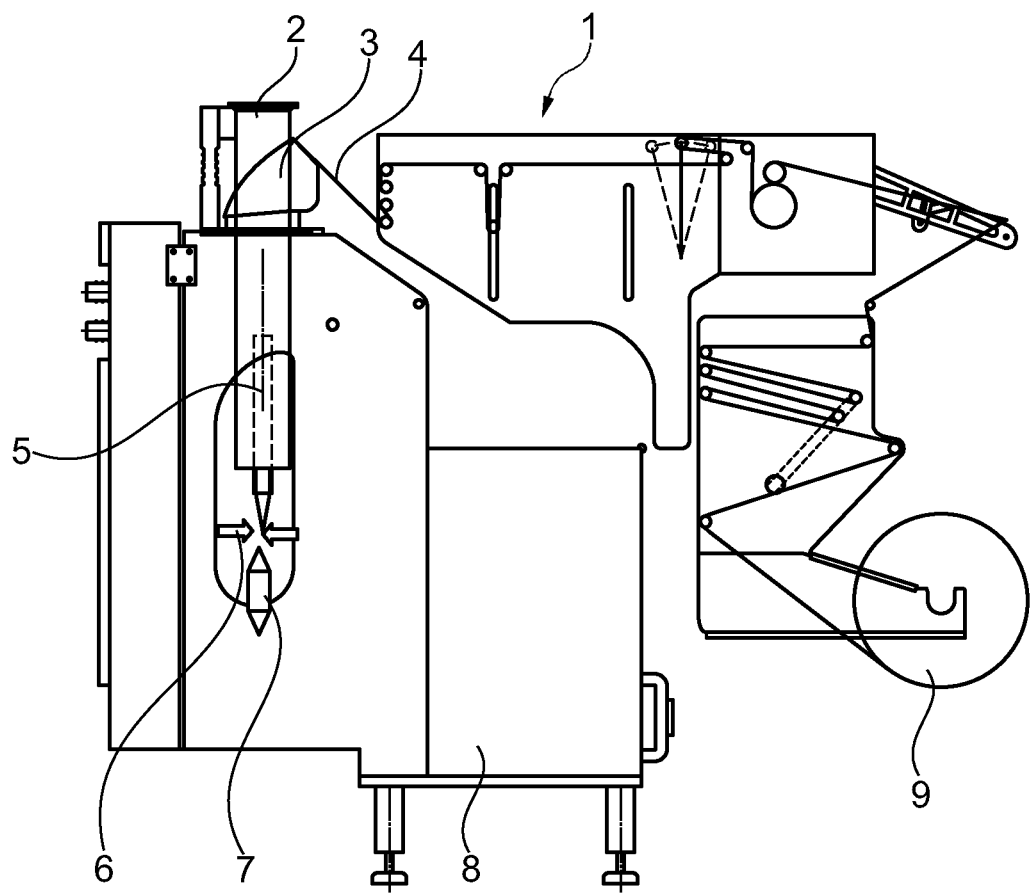
FIG. 1 schematically illustrates a flow-wrapper according to a preferred embodiment of the present invention.

In FIG. 1, the flow-wrapper 1 according to the invention is schematically shown, which comprises a frame 8. A web, here a film 4, especially a weldable plastic film 4, is preferably continuously supplied from a reel 9 to a form shoulder 3, which shapes the web 4 into a tubular form around a form-fill tube 2. In the context of the present invention, a "tubular form" of the packages 7 or of the web 4 means any cross-sectional form including a circular form or another form, and especially a rectangular- or generally a polygonal form. Longitudinal sealing means 5, which are provided downstream from the form shoulder 3, seal the edges of the tubular web 4 together. Cross sealing means 6 provide cross seals to the tubular web 4 at the downstream end of each package 7 and subsequently, the package is filled with a packaging item. Finally, an upstream cross seal is applied to the web tube 4 by means of the cross sealing means 6, which hermetically closes each package 7. The cross sealing means 6 preferably apply simultaneously an upstream cross-seal closing the top of the package 7 and a downstream cross-seal defining the bottom of the subsequent, upstream package 7. The packages 7 are separated from one another by a cutting means 6, which are preferably incorporated into the cross-sealing means 6. For the application of each cross seal(s), the seal jaws are reciprocated from an open position, in which the seal jaws are spaced apart to a sealing position, in which the seal jaws are pressed together and apply a pressure on the film tube.

For a continuous production of packages, the seal jaws are reciprocated between an upper- and a lower dead end centre.

The distance between the two dead end centre depends on the length of the package to be produced. During the downward movement of the seal jaws, the cross seal is applied. During the downward movement, the jaws move essentially with the same speed as the continuously fed web in this direction.

Figure 2A:
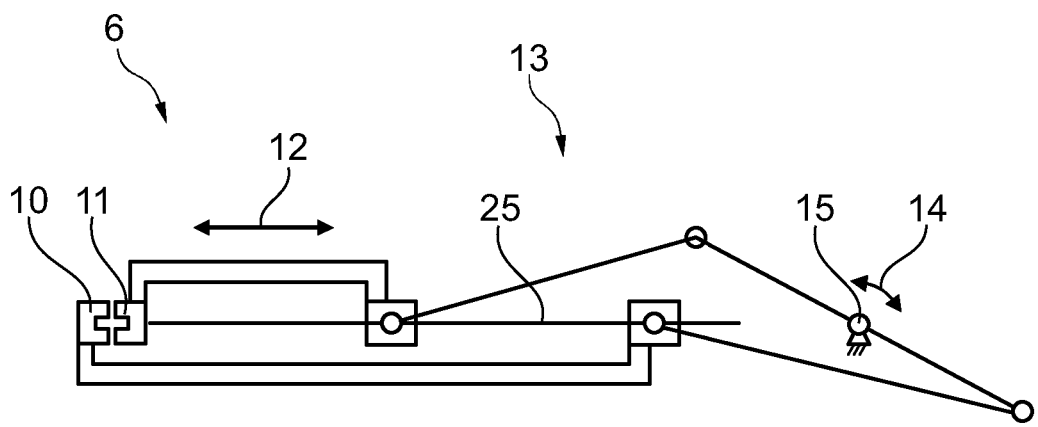
FIGS. 2a-2d each schematically illustrate gears which transfer the rotation of the motor into a linear movement of the seal-jaws.
Figure 2B:
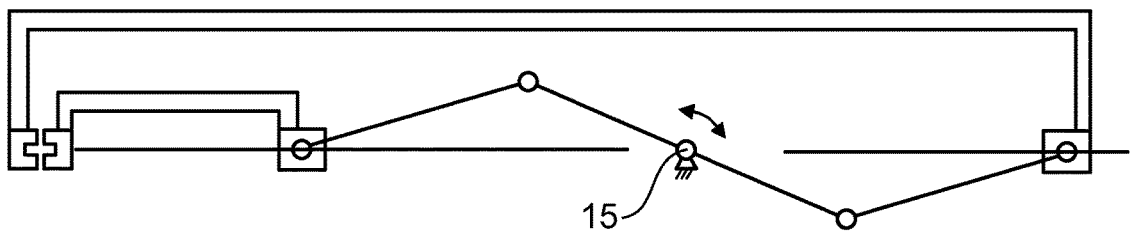
Figure 2C:
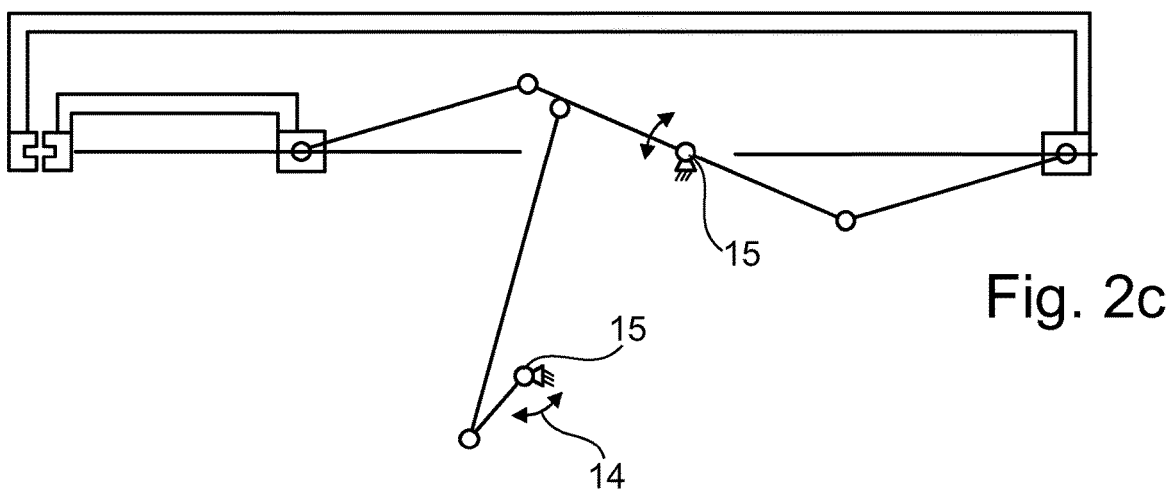

FIGS. 2a-2c each depict different embodiments of the jaw closing mechanism 13, that opens and closes the seal jaws 10, 11. The reciprocation of the seal jaws 10, between the open- and the closing position is symbolized by the double arrow 12 and is conventionally a horizontal movement transversely to the transport direction of the web. During this reciprocation, the seal jaws move along guiding means 25. The seal jaws are driven by a closing motor M (not depicted), which provides a torque and hence the rotation 14. Between the closing motor M and the jaws 10, 11 the jaw closing mechanism 13 is provided that converts the rotation 14 of the closing motor M into a linear movement of the jaws 10, 11 along the guiding means 25. The skilled person understands, that the movement of one jaw 10, 11 is sufficient for the application of the cross seal, but that a movement of both jaws 10, 11 is preferred. The jaw closing mechanism 13 preferably uses a linkage system and even more preferably is a knee lever system. These systems have the advantage of amplifying the force provided by the closing motor when the jaws are closed and ensure a fast movement during the opening of the jaws 10, 11.

In the example according to FIG. 2a a knee-lever system as the jaw closing mechanism is depicted. A lever is pivoted clockwise and counter clockwise as indicated by the double arrow 14 around a pivot point 15. Both ends of this driven lever are connected with additional levers, wherein each of these levers is connected to a seal jaw 10, 11. During the clockwise rotation of the driven lever, the jaws 10, 11 are distanced from each other, so that the seal jaws move to the open position, while counter clockwise rotation move the seal jaws to the sealing position.

Regarding the embodiment according to FIG. 2b reference can be made to the disclosure regarding the embodiment in FIG. 2a. Again, a knee-lever system is depicted and again a driven lever is pivoted around the pivot point 15 and again, a clockwise rotation moves the jaws 10, 11 to the open position, while a counter clockwise rotation moves the seal jaws into the sealing position.

In the embodiment according to FIG. 2c, a jaw closing mechanism 13 with two knee-lever systems and two pivot points 15 is depicted. A motor (not depicted) provides the rotational movement 14 which is transferred to a first knee-lever system. The second lever of this knee-lever system actuates the second knee-lever system, the knee-lever system according to FIG. 2b. A clockwise rotation of the motor results in an opening of the seal jaws, while a counter clockwise rotation moves the seal jaws into the sealing position.

Figure 2D:
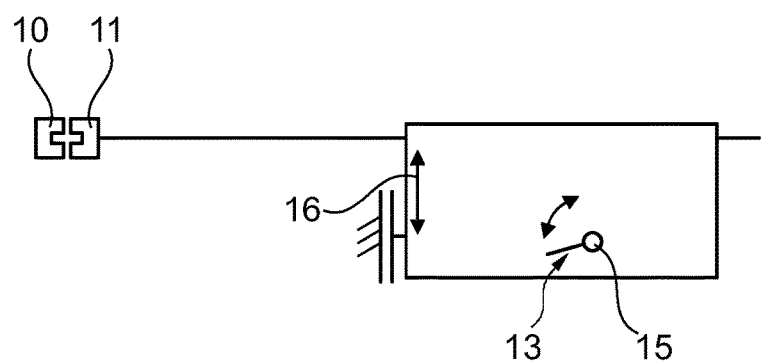

In FIG. 2d a simplified sketch of the seal jaws 10, 11 and the jaw closing mechanism 13 is depicted. The jaw closing mechanism 13 may be provided as shown in FIGS. 2a-2c. However, the skilled person understands that the jaw closing mechanism can differ from the embodiments shown in FIGS. 2a-2c. As additionally indicated in FIG. 2d, the seal jaws and the jaw closing mechanism optionally reciprocate between an upper- and a lower vertical position, preferably between an upper- and a lower dead end centre. The movement is indicated by double-arrow 16.

Figure 3:
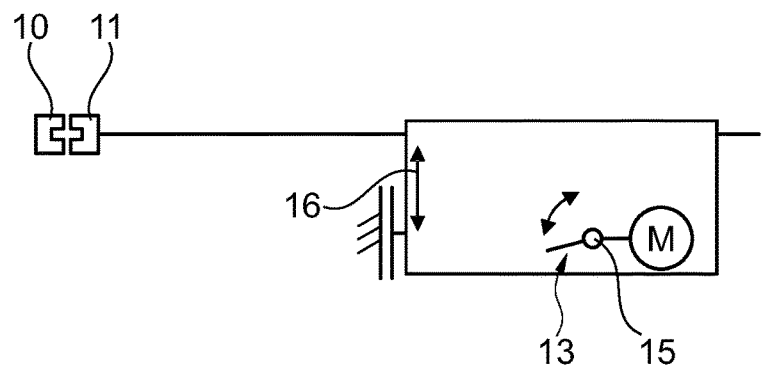
FIG. 3 depicts the state in the art.

FIG. 3 shows an embodiment according to the state in the art. In this embodiment the motor M is moved together with the seal jaws 10, 11 during their vertical movement 16. Due to the larger mass of inertia the system is less dynamic.

FIGS. 4a-4f show different embodiments of the present invention. All examples have in common that the movement 16 of the seal jaws 10, 11 is decoupled from the closing motor M. The closing motor M does not participate at all or only to a reduced extent in the movement 16 of the seal jaws. The motor is fixed to frame and not, as depicted in the embodiment according to the embodiment in FIG. 3, fixed to the seal jaws 10, 11 and/or the jaws closing mechanism 13. During the movement 16 the position of the seal jaws is independent from their vertical position. The closing motor does not need to adjust the position of the seal jaws depending on their vertical position.

Figure 4A:
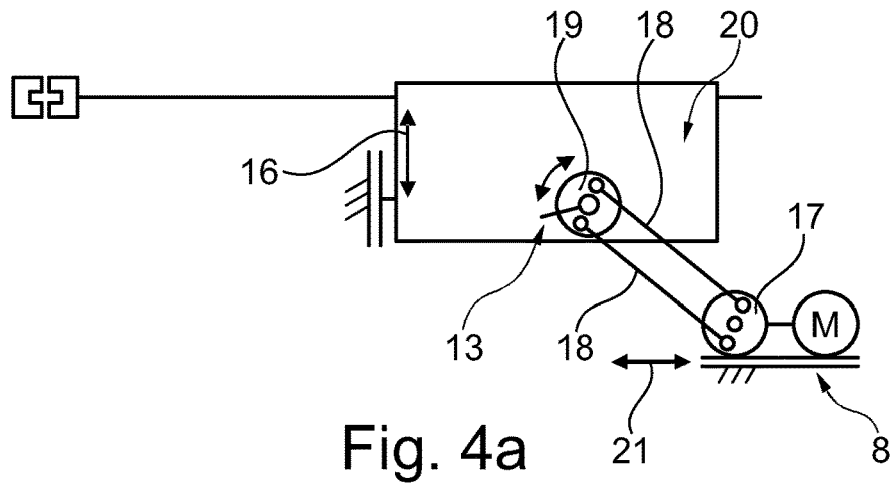
FIGS. 4a-4f depict different embodiments of the present invention.

In the embodiment according the FIG. 4a the closing motor M is attached to the frame of the vertical flow wrapper. A sliding bearing, for example a sliding platform, is provided between the frame and the closing motor. Between the closing motor M and the jaw closing mechanism 13, torque transfer means 20 are provided, which transfer the torque from the motor to the jaw closing mechanism 13. In the present case the torque transfer means 20 comprises two rotational bodies 17, 19, here wheels 17, 19, which are connected by two rods 18, which are each provided eccentrically at the rotational bodies 17, 19. While the rotational body 17 is connected to the frame of the vertical flow wrapper, the rotational body 19 participates in the vertical movement 16 of the seal jaws 10, 11. During this vertical movement 16, the closing motor M and the rotational body 17 slide along the sliding bearing 8, which is indicated by the double arrow 21. The skilled person understands, that this movement 21 is smaller than the movement 16. This results in less inertia and hence a higher dynamic system in comparison to the embodiment according to FIG. 3.

Figure 4B:
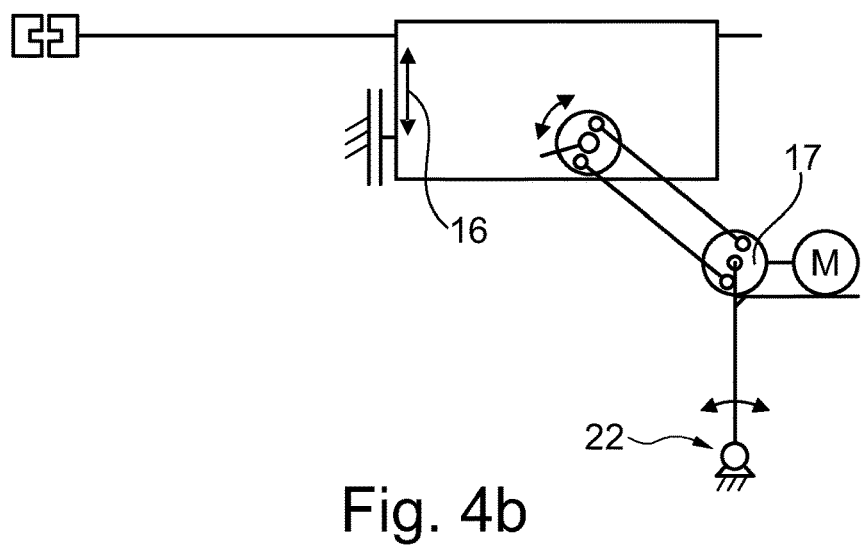

In the embodiment according to FIG. 4b, the closing motor and the rotational body can be pivoted around a pivot bearing 22, which is provided at the frame of the inventive vertical flow wrapper. This rotation indicated by the double arrow takes place during the movement 16. This results in less inertia and hence a higher dynamic system in comparison to the embodiment according to FIG. 3.

Figure 4C:
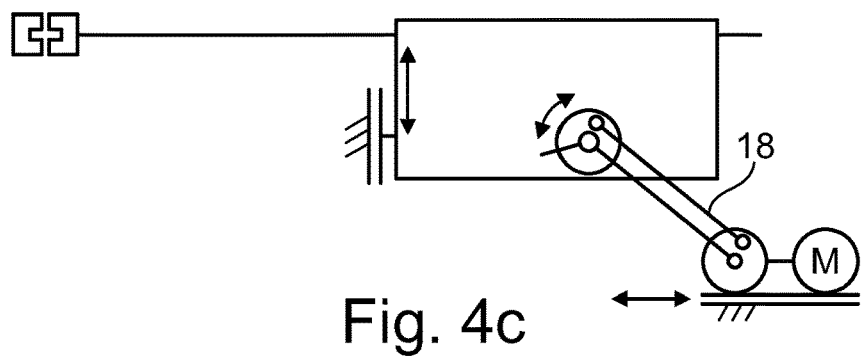

FIG. 4c essentially depicts the embodiment of FIG. 4a, so that reference can be made to the description of the FIG. 4a. Here only one rod 18 is provided which is provided between two adjacent rotational bodies.

In the embodiment according to FIG. 4d, again reference can be made to the embodiment according to FIG. 4a. However, in the present case, distancing means is provided between the two rotational bodies 17, 19. Furthermore, endless means 23, for example a toothed belt or a metal band that is fixedly connected to both rotational bodies 17, 19, is provided which transfers the torque from the rotational body 17 to the rotational body 19.

Figure 4D:
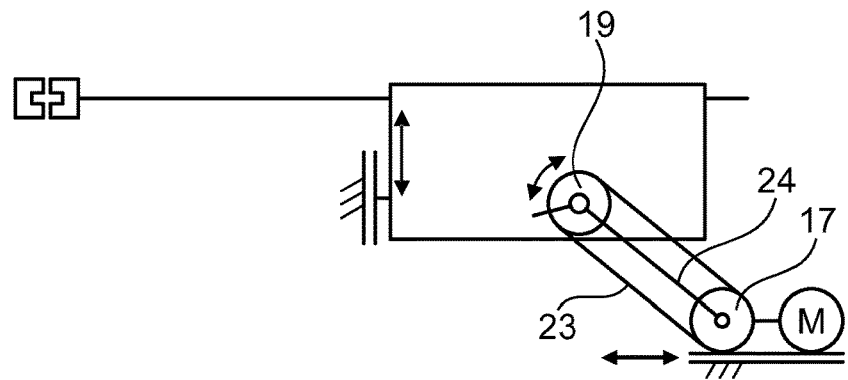
Figure 4E:
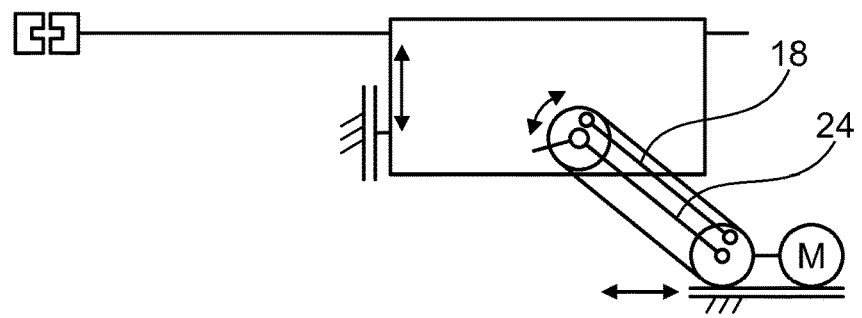

Regarding the embodiment according to FIG. 4e reference can be made to the disclosure regarding to FIG. 4d. Here additionally or alternatively a rod 18 is provided, that transfers the torque from the rotational body 17 to the rotational body 19.

The skilled person understands that regarding the embodiments of FIGS. 4c-4e, the bearing of the motor M and the rotational body 17 can also be a pivot bearing for example as depicted in FIG. 4b.

Figure 4F:
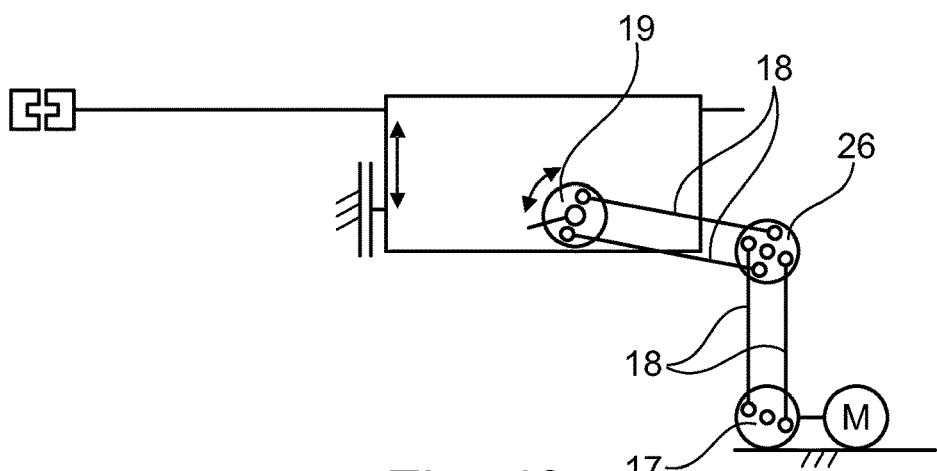

FIG. 4f shows another inventive embodiment of the present invention. In the present case, a so-called Schmidt-coupling is provided between the closing motor and the jaw closing mechanism 13. The Schmidt-coupling comprises here three rotational bodies 17, 19 and 26, wherein two adjacent rotational bodies are torque-wise connected, for example by torque transfer means 18. The attachments points of the torque transfer means 18 are selected such, that during the vertical movement 16 of the seal jaws 10, 11 no movement at all of closing motor M takes place.

Regarding FIG. 4f, in another, not depicted embodiment, the rotational bodies 17, 19, 26 are provided as depicted. However, these rotational bodies 17, 19, 26 are preferably not rotationally connected by rods 18, but by endless means 23 for example a toothed belt or a metal band that is fixedly connected to the rotational bodies 17, 19, 26 in order to transfer the torque from the rotational body 17 to rotational body 26 and from rotational body 26 to rotational body 19. Preferably one endless means 23 is provided between rotational bodies 17 and 26 and another one between rotational bodies 26 and 19.

All inventive embodiments according the FIGS. 4a-4f have in common that the motor M does not only provide the torque to energize the rotation of the rotational body 17. The closing- and/or open-position needs not be adjusted during the vertical movement of the seal-jaws 10, 11 and the jaw closing mechanism 13. The position of the levers of the jaw closing mechanism 13 do not change during the vertical reciprocation of the seal-jaws 10, 11 and the jaw closing mechanism 13. This results in a constant stiffness of the closing mechanism and a constant sealing pressure.

REFERENCE SIGNS

1 Flow-wrapper
2 Form-fill tube
3 Form shoulder
4 Web, film/tubular web, tubular film
5 Longitudinal sealing-means
6 Cross sealing means and/or Cutting means
7 Package/Pouch
8 Frame/Housing
9 Reel
10 first jaw
11 second jaw
12 opening/closing movement of at least one jaw
13 jaw closing mechanism, crank-mechanism
14 rotation
15 pivot point
16 vertical movement
17 first rotational body, wheel
18 rod, lever
19 second rotational body, wheel
20 torque transfer means
21 sliding movement
22 bearing at the frame
23 endless belt, toothed belt
24 distancing means
25 guiding means
26 third rotational body, wheel
M Closing motor

The invention claimed is:

1. Vertical flow-wrapper comprising:
a frame,
a web feed, which feeds a web to a form-shoulder and a form-fill tube, which form the web into a web tube,
a longitudinal sealing-means to seal longitudinal edges of the web tube together, and
a cross sealing means to provide a cross-seal to the web tube to produce individual packages,
wherein the cross sealing means comprises seal jaws, a closing motor, and a jaw closing mechanism provided between the closing motor and the seal jaws, wherein the seal jaws and the jaw closing mechanism reciprocate between an upper and a lower vertical position driven by a reciprocation motor,
wherein the closing motor is provided at the frame and a torque transfer means is provided between the closing motor and the jaw closing mechanism,
wherein the closing motor and the reciprocation motor are operated independently from each other, and
wherein the closing motor is connected to the frame by a slide bearing or the closing motor is pivotably connected to the frame.

2. Vertical flow-wrapper according to claim 1, wherein a vertical movement of the seal jaws and the jaw closing mechanism does not influence a position of the seal jaws.

3. Vertical flow-wrapper according to claim 1, wherein an extent of a vertical movement of the seal jaws is larger than an extent of a horizontal movement of the closing motor.

4. Vertical flow-wrapper according to claim 1, wherein the closing motor does not have a vertical movement or any movement.

5. Vertical flow-wrapper according to claim 1, wherein the closing motor slides, during the reciprocation of the seal jaws between the upper and the lower vertical position, along a plane which has at least a horizontal component, or along a horizontal plane.

6. Vertical flow-wrapper according to claim 1, wherein the closing motor rotates relative to the frame during the reciprocation of the seal jaws between the upper and the lower vertical position, around a horizontal axis.

7. Vertical flow-wrapper according to claim 1, wherein the torque transfer means comprises at least two rotational bodies or wheels, which are rotationally connected.

8. Vertical flow-wrapper according to claim 7, wherein at least one rod is attached eccentrically to two of the at least two rotational bodies or wheels.

9. Vertical flow-wrapper according to claim 7, wherein two of the at least two rotational bodies or wheels are rotationally connected by an endless belt or by a toothed belt or by a metal-band fixedly connected to the two rotational bodies or wheels.

10. Vertical flow-wrapper according to claim 7, wherein a distancing means are provided between two of the at least two rotational bodies or wheels.

11. Vertical flow-wrapper according to claim 7, wherein the torque transfer means is a Schmidt-coupling.

12. Vertical flow-wrapper comprising:
a frame,
a web feed, which feeds a web to a form-shoulder and a form-fill tube, which form the web into a web tube,
a longitudinal sealing-means to seal longitudinal edges of the web tube together, and
a cross sealing means to provide a cross-seal to the web tube to produce individual packages,
wherein the cross sealing means comprises seal jaws, a closing motor, and a jaw closing mechanism provided between the closing motor and the seal jaws, wherein the seal jaws and the jaw closing mechanism reciprocate between an upper and a lower vertical position driven by a reciprocation motor,
wherein the closing motor is provided at the frame and a torque transfer means is provided between the closing motor and the jaw closing mechanism,
wherein the closing motor and the reciprocation motor are operated independently from each other, wherein the closing motor is connected to the frame by a slide bearing or the closing motor is pivotably connected to the frame, wherein the closing motor rotates relative to the frame during the reciprocation of the seal jaws between the upper and the lower vertical position, around a horizontal axis, wherein the torque transfer means comprises at least two rotational bodies or wheels, which are rotationally connected.

13. Vertical flow-wrapper according to claim 12, wherein two of the at least two rotational bodies or wheels are rotationally connected by an endless belt or by a toothed belt or by a metal-band fixedly connected to the two rotational bodies or wheels.

14. Vertical flow-wrapper according to claim 13, wherein a distancing means are provided between two of the at least two rotational bodies or wheels.

15. Vertical flow-wrapper according to claim 14, wherein a vertical movement of the seal jaws and the jaw closing mechanism does not influence a position of the seal jaws.

\* \* \* \* \*